(12) United States Patent
Gomatam et al.

(10) Patent No.: US 11,971,592 B2
(45) Date of Patent: Apr. 30, 2024

(54) CABLE HAVING RIBBON STACK IN A HEXAGONAL ARRANGEMENT

(71) Applicant: Sterlite Technologies Limited, Gurgaon (IN)

(72) Inventors: Badri Gomatam, Gurugram (IN); Manish Sinha, Gurugram (IN)

( * ) Notice: Subject to any disclaimer, the term of this patent is extended or adjusted under 35 U.S.C. 154(b) by 282 days.

(21) Appl. No.: 17/139,720

(22) Filed: Dec. 31, 2020

(65) Prior Publication Data

US 2022/0050255 A1 Feb. 17, 2022

(30) Foreign Application Priority Data

Aug. 17, 2020 (IN) .............................. 202011035295

(51) Int. Cl.
  *G02B 6/44* (2006.01)
  *F21V 8/00* (2006.01)
  *G02B 6/36* (2006.01)

(52) U.S. Cl.
  CPC ......... *G02B 6/4403* (2013.01); *G02B 6/0076* (2013.01); *G02B 6/3676* (2013.01); *G02B 6/4411* (2013.01)

(58) Field of Classification Search
  CPC .. G02B 6/4403; G02B 6/0076; G02B 6/3676; G02B 6/4411
  USPC .................................................... 385/14, 114
  See application file for complete search history.

(56) References Cited

U.S. PATENT DOCUMENTS

| | | | |
|---|---|---|---|
| 2016/0216468 A1* | 7/2016 | Gimblet | G02B 6/4404 |
| 2017/0031121 A1* | 2/2017 | Blazer | G02B 6/4434 |
| 2019/0049681 A1* | 2/2019 | Bookbinder | G02B 6/448 |
| 2019/0310420 A1* | 10/2019 | Allen | G02B 6/29335 |
| 2020/0081186 A1* | 3/2020 | Wu | G02B 6/255 |
| 2020/0386962 A1* | 12/2020 | Mittal | G02B 6/448 |

* cited by examiner

*Primary Examiner* — Jerry M Blevins
(74) *Attorney, Agent, or Firm* — Steven R. Fairchild; Michael J. Pennington

(57) ABSTRACT

The present disclosure provides a method for stacking a plurality of optical fibre ribbons in an optical fibre cable. The method includes a step of arranging a plurality of optical fibre ribbon stacks in a hexagonal arrangement in the optical fibre cable. The method may further include stacking the plurality of optical fibre ribbons to form an optical fibre ribbon stack such that the optical fibre ribbon stack may have a parallelogram shape. Each optical fibre ribbon is placed at an offset from adjacent optical fibre ribbon. The optical fibre ribbon stack may have a stack height. In addition, each optical fibre ribbon of the plurality of optical fibre ribbons may have a ribbon height. The hexagonal arrangement may have the packaging density greater than 80%.

16 Claims, 9 Drawing Sheets

300

302

304

800

CABLE HAVING RIBBON STACK IN A HEXAGONAL ARRANGEMENT

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

Field of the Invention

The present disclosure relates to the field of optical fibre cables and, in particular, relates to a cable having ribbon stack in a hexagonal arrangement.

Description of Related Art

With the advancements in science and technology, various modern technologies are being employed for communication purposes. One of the most important modern communication technologies is optical fibre communication technology using a variety of optical fibre cables. In addition, the optical fibre cables are widely used for communication to meet the increasing demands. The increasing demands of the optical fibre communication technology lead to the installation of high fibre density cables. The high fibre density cables include a large number of optical fibres inside cable. The optical fibres may be in the form of optical fibre ribbons. Conventionally, poor packing efficiency of the optical fibre ribbons leads to the increase in cable diameter in the high fibre count cables. In addition, conventional high fibre count cables are inefficient at junction points and manhole installation. Further, the optical fibre ribbons of the conventional high fibre count cables collapse when load or force is applied at centre of the optical fibre ribbons. Furthermore, identification of each ribbon from the optical fibre ribbons of the conventional high fibre count cables is inconvenient. Moreover, the conventional high fibre count cables have lower optical performance. Also, linear scaling to achieve high fibre count in conventional high fibre count cables manufacturing is impractical. Some of the prior art references are given below:

CN208937772U discloses an optical fibre band optical cable. The optical fibre band optical cable includes several ribbon-units and over-sheath. In addition, over-sheath is arranged on the outer surface of the ribbon-units. Further, the ribbon-unit includes fibre ribbon matrix and band-like loose tube. Furthermore, fibre ribbon matrix has not same core number. Moreover, fibre ribbon stack has a shape of regular polygon.

CN109031559B discloses a large-core-number high-density sleeve optical cable. The large-core-number high-density sleeve optical cable includes an outer sheath and a loose sleeve coated in the outer sheath. In addition, an optical communication unit is laid in the loose sleeve. Further, the large-core-number high-density sleeve optical cable is characterized in that the loose sleeve is a polygonal loose sleeve.

EP1039483A1 discloses an oxide superconducting wire. The oxide superconducting wire is characterized in that the cross section of the wire is round and is composed of several units, each consisting of tape-like superconductors laminated in an approximately rhombic shape, said units being arranged such that they form a hexagon as a whole.

While the prior arts cover various approaches to arrange stacks of ribbon in the high fibre density cable, there are no significant considerations to arrange interleaved ribbon stacks in a shape of hexagon to increase packing efficiency. In light of the above-stated discussion, there is a need to overcome the above stated disadvantages.

BRIEF SUMMARY OF THE INVENTION

In an aspect, the present disclosure provides a method for stacking a plurality of optical fibre ribbons in an optical fibre cable. The method includes a step of arranging a plurality of optical fibre ribbon stacks in a hexagonal arrangement in the optical fibre cable.

A primary object of the present disclosure is to provide an optical fibre cable.

The method may further include stacking the plurality of optical fibre ribbons to form an optical fibre ribbon stack such that the optical fibre ribbon stack may have a parallelogram shape.

The method may further include stacking the plurality of optical fibre ribbons to form the optical fibre ribbon stack such that the optical fibre ribbon stack may have the parallelogram shape. Each optical fibre ribbon is placed at an offset from adjacent optical fibre ribbon. The offset is in between 25% to 75% of a pitch of an optical fibre ribbon.

The optical fibre ribbon stack may have a stack height. In addition, each optical fibre ribbon of the plurality of optical fibre ribbons may have a ribbon height. Further, the stack height is less than summation of the ribbon height of each optical fibre ribbon of the plurality of optical fibre ribbons.

The hexagonal arrangement may have the packaging density greater than 80%.

In another aspect, the present disclosure provides the optical fibre cable. The optical fibre cable includes the plurality of optical fibre ribbon stacks in the hexagonal arrangement in the optical fibre cable.

The optical fibre cable may include the plurality of optical fibre ribbons. The plurality of optical fibre ribbons are stacked to form the optical fibre ribbon stack such that the optical fibre ribbon stack may have the parallelogram shape.

The optical fibre cable may include the plurality of optical fibre ribbons. The plurality of optical fibre ribbons are stacked to form the optical fibre ribbon stack such that the optical fibre ribbon stack may have the parallelogram shape. Each optical fibre ribbon is placed at the offset from adjacent optical fibre ribbon. The offset is in between 25% to 75% of a pitch of the optical fibre ribbon.

The optical fibre ribbon stack may have the stack height. In addition, each optical fibre ribbon of the plurality of optical fibre ribbons may have the ribbon height. Further, the stack height is less than summation of the ribbon height of each optical fibre ribbon of the plurality of optical fibre ribbons.

The hexagonal arrangement may have the packaging density greater than 80%.

DESCRIPTION OF THE DRAWINGS

In order to best describe the manner in which the above-described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which.

Figure 1:
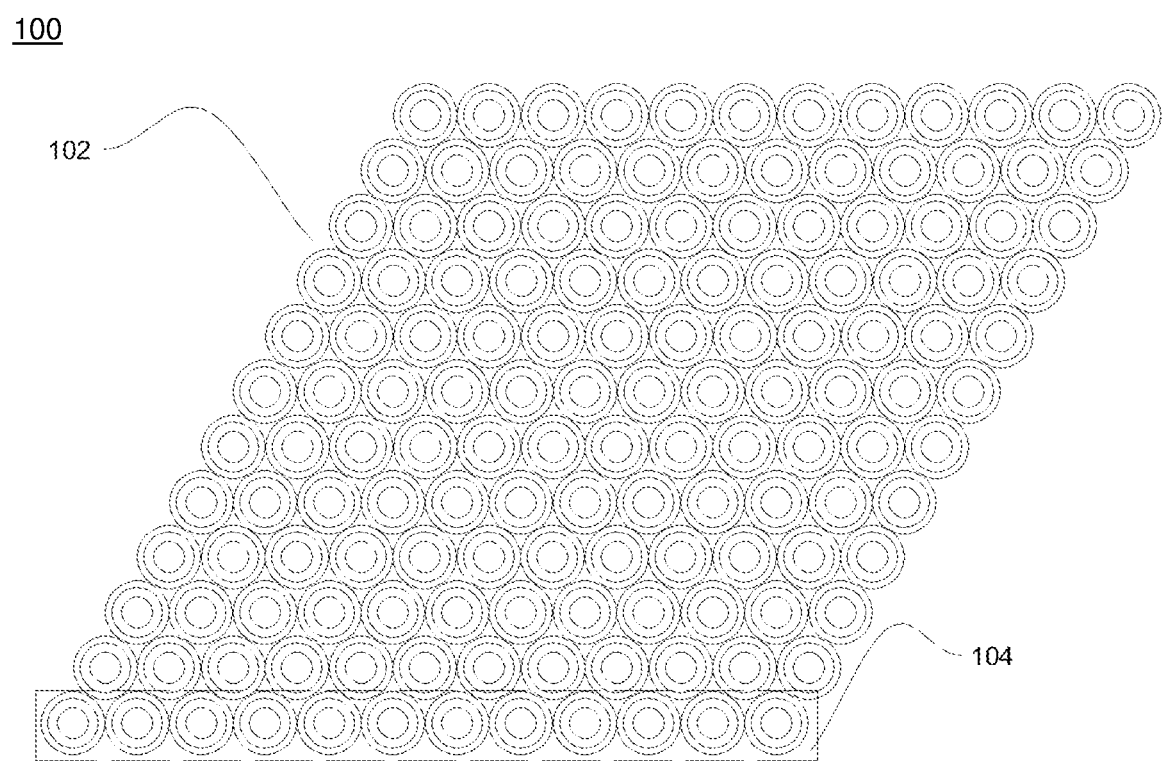
FIG. 1 illustrates a cross sectional view of an optical fibre ribbon stack.

It should be noted that the accompanying figures are intended to present illustrations of few exemplary embodiments of the present disclosure. These figures are not intended to limit the scope of the present disclosure. It should also be noted that accompanying figures are not necessarily drawn to scale.

REFERENCE NUMERALS IN THE DRAWINGS

For a more complete understanding of the present invention parts, reference is now made to the following descriptions:

100. Cross sectional view.
102. Optical fibre ribbon stack.
104. Optical fibre ribbon.
200. Cross sectional view.
202. Hexagonal arrangement.
s1. The first side.
s2. The second side.
d1. The diagonal length.
300. Cross sectional view.
302. The optical fibre ribbon stack.
304. Plurality of optical fibre ribbons.
400. Cross sectional view.
402. Another hexagonal arrangement.
s3. A side.
d2. Diagonal length.
d3. Diameter.
d4. Diameter.
500. Cross sectional view.
502. Hexagonal arrangement.
d6. Diameter.
d5. Diagonal length.
600. Cross sectional view.
h2. Stack height.
Df+Δf. The pitch.
Ltr. Width.
Ttr. Ribbon height.
l1. The outer length.
700. Cross sectional view.
Df. Fibre diameter.
h3. Stack height.
Ttr. Ribbon height.
l1. The outer length.
800. The arbitrary angle stack.
OA. Height.
AP. Height.
PQ. Height.
Df+Δh. Ribbon height.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

FIG. 1 illustrates a cross sectional view 100 of an optical fibre ribbon stack 102. The optical fibre ribbon stack 102 includes a plurality of optical fibre ribbons. Further, the plurality of optical fibre ribbons includes an optical fibre ribbon 104. Furthermore, the plurality of optical fibre ribbons increases optical fibre density of an optical fibre cable. Moreover, the optical fibre cable includes a hexagonal arrangement 202 (shown in FIG. 2). Also, the hexagonal arrangement 202 includes a plurality of optical fibre ribbon stacks 102. Also, the optical fibre ribbon stack 102 includes the plurality of optical fibre ribbons. Also, each of the plurality of optical fibre ribbons is arranged to form the optical fibre ribbon stack 102. Also, the optical fibre ribbon 104 includes a plurality of optical fibres. Each of the plurality of optical fibres is placed adjacent to another optical fibre of the plurality of optical fibres. Also, the plurality of optical fibre ribbons is stacked to form the optical fibre ribbon stack such that the optical fibre ribbon stack 102 may have a parallelogram shape (as shown in FIG. 1). Each optical fibre ribbon is placed at an offset from adjacent optical fibre ribbon in the optical fibre ribbon stack 102. The optical fibre ribbon placed above another optical fibre ribbon is placed such that optical fibres of the optical fibre ribbon are positioned between interstitial spaces between optical fibres of another optical fibre ribbon. The positioning of the ribbons creates the offset between the two optical fibre ribbons. Also, the offset is in between 25% to 75% of a pitch of an optical fibre ribbon. Also, the pitch is spacing between centres of two successive optical fibres of the plurality of optical fibres.

Each of the plurality of optical fibres is an optical fibre used to transmit information as light pulses from one end to another. In addition, each of the plurality of optical fibres is a thin strand of glass or plastic capable for transmitting optical signals. Further, each of the plurality of optical fibres is configured to transmit large amounts of information over long distances with relatively low attenuation. Furthermore, each of the plurality of optical fibres includes a core region and a cladding region. The core region is an inner part of the optical fibre and the cladding section is an outer part of the optical fibre. Moreover, the core region is defined by a central longitudinal axis of each of the plurality of optical fibres. Also, the cladding region surrounds the core region.

The core region and the cladding region are formed along a central longitudinal axis of each of the plurality of optical fibres. In addition, the core region and the cladding region are formed during the manufacturing stage of each of the plurality of optical fibres. The core region may have a refractive index that is greater than a refractive index of the cladding region.

In addition, the optical fibre ribbon 104 is a flexible optical fibre ribbon. Further, number of the plurality of optical fibres in the optical fibre ribbon 104 is 12. Furthermore, number of the plurality of optical fibres in the optical fibre ribbon 104 may vary.

In addition, each optical fibre ribbon of the plurality of optical fibre ribbons is stacked on top of adjacent optical fibre ribbon of the plurality of optical fibre ribbons. Further, the stacking of the plurality of optical fibre ribbons forms the optical fibre ribbon stack 102. Furthermore, the optical fibre ribbon stack 102 may have a parallelogram shape. Moreover, the plurality of optical fibre ribbon is interleaved to form the parallelogram shape for the optical fibre ribbon stack 102. Also, number of the plurality of optical fibre ribbons in the optical fibre ribbon stack 102 is 12. Also, number of the plurality of optical fibre ribbons in the optical fibre ribbon stack 102 may vary. In general, parallelogram is a quadrilateral with opposite sides parallel. In addition, opposite sides of parallelogram are of equal length and opposite angles of parallelogram are equal. Further, the parallelogram has a side angle which deviates from 60° to the base of the parallelogram.

Figure 2:
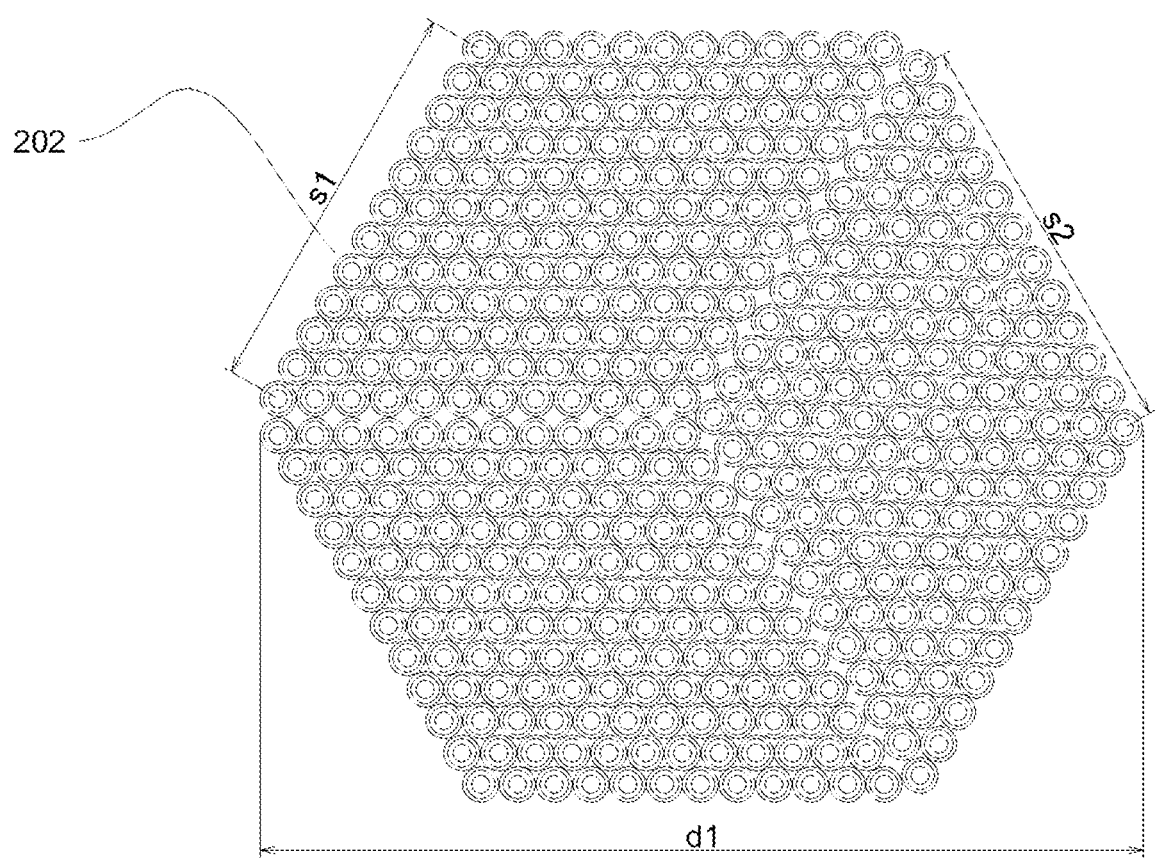
FIG. 2 illustrates a cross sectional view of a hexagonal arrangement of a plurality of optical fibre ribbon stacks of FIG. 1.

FIG. 2 illustrates a cross sectional view 200 of the hexagonal arrangement 202 of the plurality of optical fibre ribbon stacks 102 (as illustrated in FIG. 1). The cross sectional view 200 illustrates the hexagonal arrangement 202 of the plurality of optical fibre ribbon stacks 102. The hexagonal arrangement 202 of FIG. 2 is made using three of the optical fibre ribbons stack 102 of FIG. 1. Each of the three optical fibre ribbon stack 102 is placed at such an angle with respect to another optical fibre ribbon stack 102 in order to achieve the hexagonal arrangement 202. The hexagonal arrangement 202 of the plurality of optical fibre ribbon stacks 102 is characterised by a packaging density. In addition, the packaging density corresponds to fraction of area in the hexagonal arrangement 202 that is occupied by the plurality of optical fibre ribbon stacks 102. Further, an expression to determine the packaging density of the hexagonal arrangement 202 is given below:

$$PF_{hex} = \frac{3\sqrt{3}}{2\pi} PF_{hex} = \frac{3\sqrt{3}}{2\pi} = 0.82699$$

The hexagonal arrangement 202 may have the packaging density greater than 80%.

Further, the optical fibre ribbon 104 is arranged on top of each other with a "shift" (each ribbon is offset by half of the pitch of an optical fibre ribbon) in accordance with a prescribed angle of 60° for forming a hexagonal stack. For the hexagonal stack, the inter-fiber spacing along the width of the ribbon must be equal to the interstitial distance along the height of the stack. The basic ribbon stack 100 shown here in FIG. 1 is a normal 12×12 ribbon stack evolved at a 60° angle to the base layer. Three such ribbon stacks are rotated by 120° with reference to each other to form a hexagon (as illustrated in FIG. 2). A hexagonal stack can become an evolved sub-unit or simply cascaded to agglomerate even larger stacks to form even larger hexagons, to fill the circle.

In addition, number of the optical fibre ribbon stack 102 in the hexagonal arrangement 202 is 3. Further, number of the optical fibre ribbon stack 102 in the hexagonal arrangement 202 may vary. Furthermore, number of the plurality of optical fibre ribbons in the hexagonal arrangement 202 is 36. Moreover, number of the plurality of optical fibre ribbons in the hexagonal arrangement 202 may vary.

In addition, number of the plurality of optical fibres in the hexagonal arrangement 202 is 432. Further, number of the plurality of optical fibres in the hexagonal arrangement 202 may vary. Furthermore, the hexagonal arrangement 202 may have a first side s1 having a length of about 2.75 millimetres. Moreover, the length of the first side s1 of the hexagonal arrangement 202 may vary.

In addition, the hexagonal arrangement 202 may have a second side s2 having a length of about 2.75 millimetres. Further, the length of the second side s2 of the hexagonal arrangement 202 may vary. Furthermore, the hexagonal arrangement 202 may have a diagonal length d1 of about 5.9985 millimetres. Moreover, the diagonal length d1 of the hexagonal arrangement 202 may vary.

In addition, each of the plurality of optical fibre ribbon stacks 102 of the hexagonal arrangement 202 are characterised by a colour. In an example, each of the plurality of optical fibre ribbon stacks 102 of the hexagonal arrangement 202 may have same colour. In another example, each of the plurality of optical fibre ribbon stacks 102 of the hexagonal arrangement 202 may have different colour. In addition, colouring of the plurality of optical fibre ribbon stacks 102 is done to identify each of the plurality of optical fibre ribbon stacks 102. Further, the colour includes but may not be limited to green, black, violet, pink, brown, blue, yellow and red.

Figure 3:
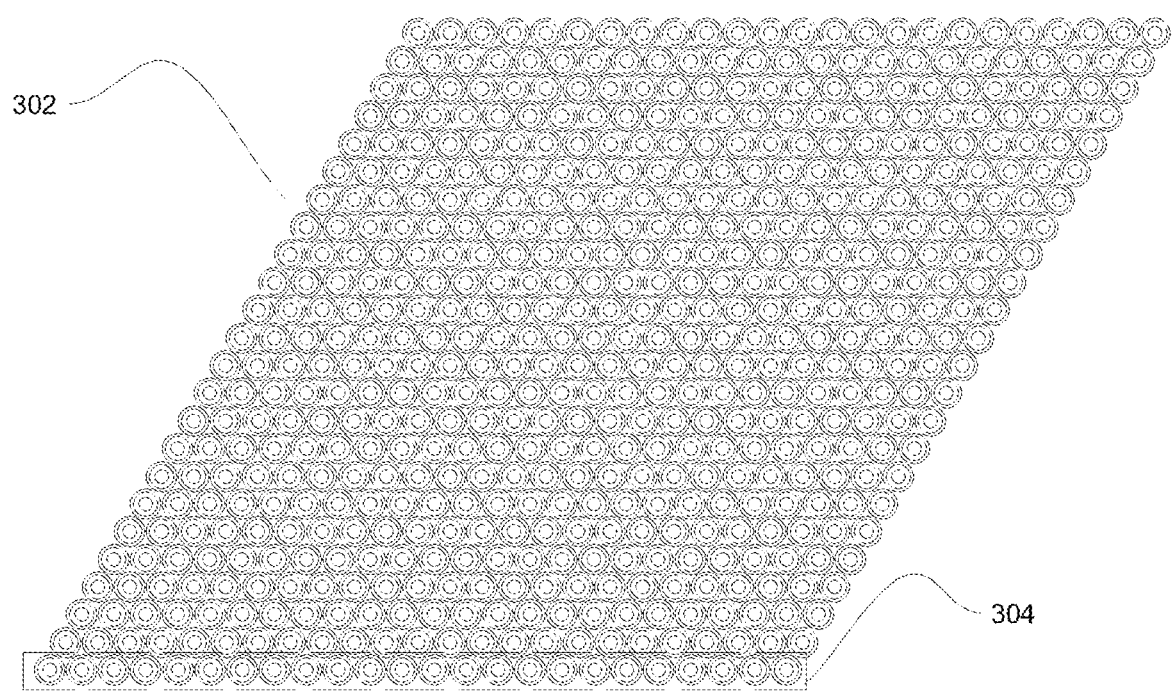
FIG. 3 illustrates a cross sectional view of another optical fibre ribbon stack.

FIG. 3 illustrates a cross sectional view 300 of another optical fibre ribbon stack 302. The optical fibre ribbon stack 302 is similar to the optical fibre ribbon stack 102 except a total number of optical fibre ribbons and number of fibres in each ribbon. The optical fibre ribbon stack 302 may have more number of ribbons and fibres as compared to the optical fibre ribbon stack 102. In addition, the optical fibre ribbon stack 302 includes a plurality of optical fibre ribbons 304. Further, the plurality of optical fibre ribbons 304 increases optical fibre density of the optical fibre cable. Furthermore, the plurality of optical fibre ribbons is stacked to form the optical fibre ribbon stack such that the optical fibre ribbon stack 302 may have a parallelogram shape (as shown in FIG. 3). Each optical fibre ribbon is placed at an offset from adjacent optical fibre ribbon in the optical fibre ribbon stack 302 similar to the optical fibre ribbons in the optical fibre ribbon stack 102. Moreover, the offset is in between 25% to 75% of a pitch of an optical fibre ribbon.

Each of the plurality of optical fibre ribbons 304 is a flexible optical fibre ribbon. In addition, number of the plurality of optical fibres in each of the plurality of optical fibre ribbons 304 is 24. Further, number of the plurality of optical fibres in each of the plurality of optical fibre ribbons 304 may vary.

Each optical fibre ribbon of the plurality of optical fibre ribbons 304 is stacked on top of adjacent optical fibre ribbon of the plurality of optical fibre ribbons 304 (as explained above). In addition, number of the plurality of optical fibre ribbons 304 in the optical fibre ribbon stack 302 is 24. Further, number of the plurality of optical fibre ribbons 304 in the optical fibre ribbon stack 302 may vary.

Figure 4:
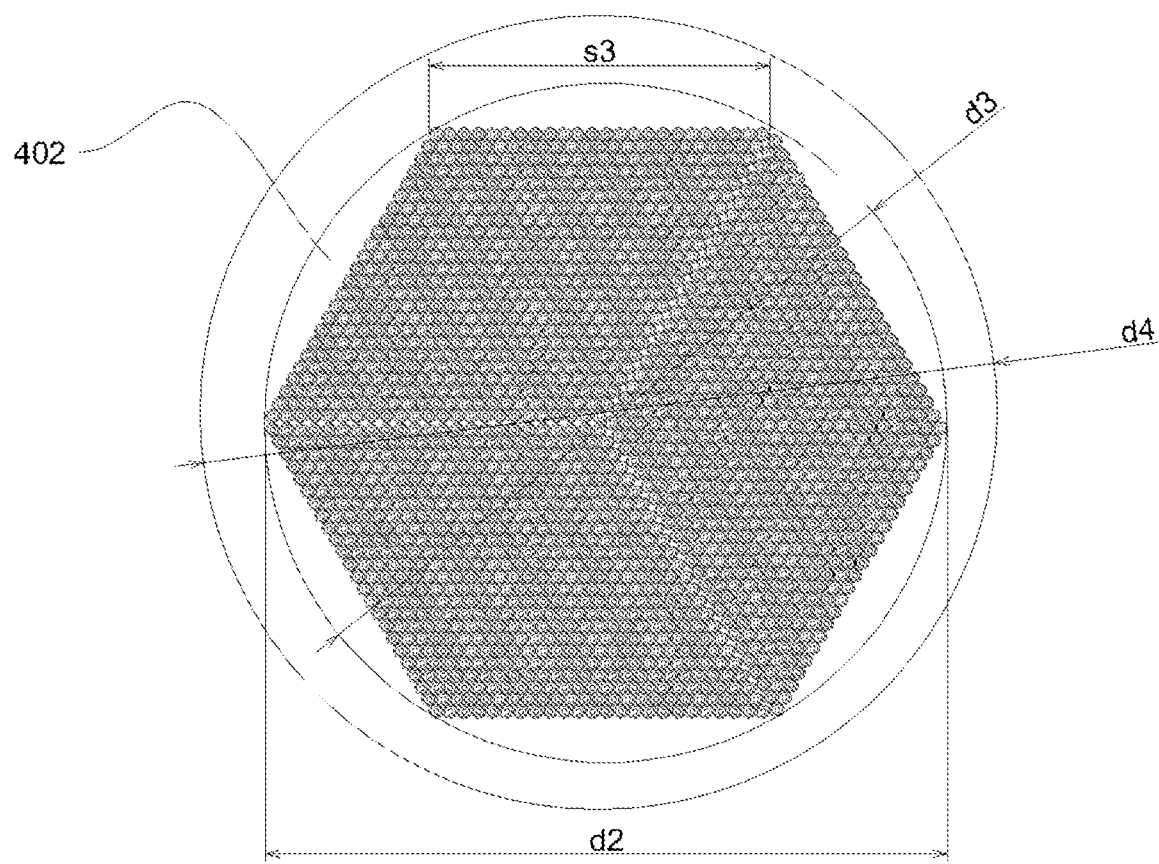
FIG. 4 illustrates a cross sectional view of another hexagonal arrangement of a plurality of optical fibre ribbon stacks of FIG. 3 inscribed in a circle.

FIG. 4 illustrates a cross sectional view 400 of another hexagonal arrangement 402 of the plurality of optical fibre ribbon stacks 302 (as illustrated in FIG. 3) inscribed in a circle. The cross sectional view 400 illustrates the hexagonal arrangement 402 of the plurality of optical fibre ribbon stacks 302. The hexagonal arrangement 402 of FIG. 4 is made using three of the optical fibre ribbon stack 302 of FIG. 3. Each of the plurality of optical fibre ribbon stacks 302 is placed at such an angle with respect to another optical fibre ribbon stack in order to achieve the hexagonal arrangement 402.

In addition, number of the plurality of optical fibre ribbon stacks 302 in the hexagonal arrangement 402 is 3. Further, number of the plurality of optical fibre ribbon stacks 302 in the hexagonal arrangement 402 may vary. Furthermore, number of the plurality of optical fibre ribbons 304 in the hexagonal arrangement 402 is 72. Moreover, number of the plurality of optical fibre ribbons 304 in the hexagonal arrangement 402 may vary.

In addition, number of the plurality of optical fibres is 1728. Further, number of the plurality of optical fibres may vary. Furthermore, the hexagonal arrangement 402 may have a side s3 having a length of about 6 millimetres. Moreover, the length of the side s3 of the hexagonal arrangement 402 may vary.

In addition, the hexagonal arrangement 402 may have a diagonal length d2 of about 12.0006 millimetres. Further, the diagonal length d2 of the hexagonal arrangement 402 may vary. Furthermore, the hexagonal arrangement 402 is inscribed in the circle. Moreover, the cross sectional view 400 illustrates an outer circle. Also, the circle may have a diameter d3 of about 12.0010 millimetres. Also, the diameter d3 of the circle may vary. The outer circle may have a diameter d4 of about 16 millimetres. The diameter d4 of the outer circle may vary.

In addition, each of the plurality of optical fibre ribbon stacks 302 of the hexagonal arrangement 402 is characterised by a colour similar to the plurality of optical fibre ribbon stacks 102 of the hexagonal arrangement 202. Further, the hexagonal arrangement 202 may have the packaging density greater than 80%.

Figure 5:
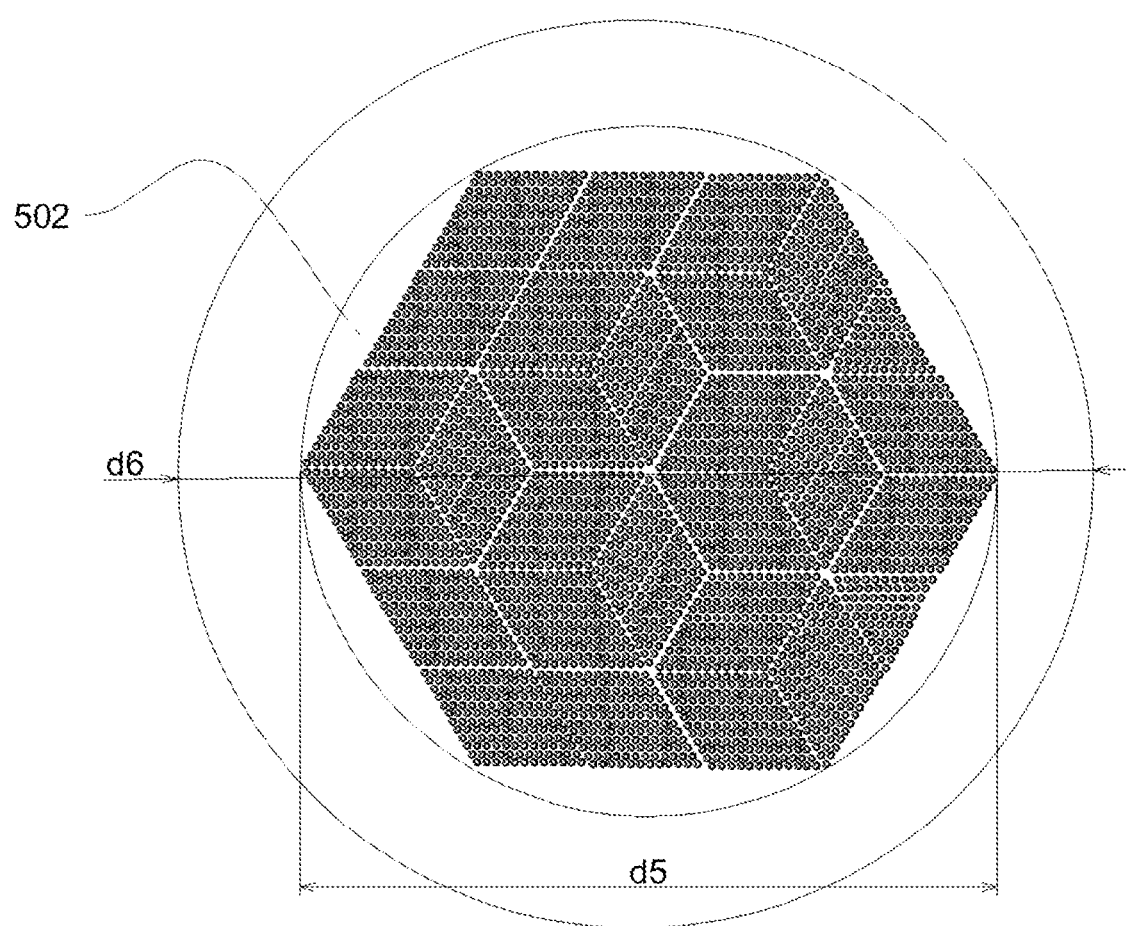
FIG. 5 illustrates a cross sectional view of yet another hexagonal arrangement of the plurality of optical fibre ribbon stacks of FIG. 3 inscribed in a circle.

FIG. 5 illustrates a cross sectional view 500 of a hexagonal arrangement 502 of the plurality of optical fibre ribbon stacks 302 (as illustrated in FIG. 3) inscribed in the circle. The cross sectional view 500 illustrates the hexagonal arrangement 502 of the plurality of optical fibre ribbon stacks 302. The hexagonal arrangement 502 of FIG. 4 is made using multiple numbers of optical fibre ribbon stacks of FIG. 3. Each of the optical fibre ribbon stack 302 is placed at such an angle with respect to another optical fibre ribbon stack 302 in order to achieve the hexagonal arrangement 502.

In addition, number of the plurality of optical fibre ribbon stacks 302 in the hexagonal arrangement 502 is 27. Further, number of the plurality of optical fibre ribbon stacks 302 in the hexagonal arrangement 502 may vary. Furthermore, number of the plurality of optical fibre ribbons 304 in the hexagonal arrangement 502 is 648. Moreover, number of the plurality of optical fibre ribbons 304 in the hexagonal arrangement 502 may vary.

In addition, number of the plurality of optical fibres in the hexagonal arrangement 502 is 15,552. Further, number of the plurality of optical fibres in the hexagonal arrangement 502 may vary. Furthermore, the hexagonal arrangement 502 may have a diagonal length d5 of about 36.1548 millimetres. Moreover, the diagonal length d5 of the hexagonal arrangement 502 may vary. In addition, the hexagonal arrangement 502 is inscribed in the circle. Also, the cross sectional view 500 illustrates the outer circle. The outer circle may have a diameter d6 of about 40 millimetres. The diameter d6 of the outer circle may vary.

In addition, each of twenty seven of the optical fibre ribbon stack 302 of the hexagonal arrangement 502 is characterised by a colour. Further, each of twenty seven of the optical fibre ribbon stack 302 of the hexagonal arrangement 502 may have same colour. Furthermore, each of twenty seven of the optical fibre ribbon stack 302 of the hexagonal arrangement 502 may have different colour. Moreover, colouring of the optical fibre ribbon stack 302 is done to identify the optical fibre ribbons. Also, the colour includes but may not be limited to green, black, violet, pink, brown, blue, yellow and red. Also, the hexagonal arrangement 202 may have the packaging density greater than 80%.

The plurality of optical fibre ribbons 104, 304 are stacked in an optical fibre cable according to a method. The method includes a step of arranging the plurality of optical fibre ribbon stacks 102, 302 in the hexagonal arrangement 202, 402, 502 in the optical fibre cable. It is to be noted that the methodology for arranging the plurality of optical fibre ribbon stacks 102, 302 in the hexagonal arrangement 202, 402, 502 is same. The method may further include another step of stacking the plurality of optical fibre ribbons 104, 304 to form the optical fibre ribbon stack 102, 302 such that the optical fibre ribbon 102, 302 stack may have a parallelogram shape.

The optical fibre ribbon stack 102, 302 may have a stack height. In addition, each optical fibre ribbon of the plurality of optical fibre ribbons 104, 304 may have a ribbon height. Further, the stack height is less than summation of the ribbon height of each optical fibre ribbon of the plurality of optical fibre ribbons 104, 304.

The present disclosure provides an optical fibre cable. The optical fibre cable includes the plurality of optical fibre ribbon stacks 102, 302. The plurality of optical fibre ribbon stacks 102, 302 are arranged in the hexagonal arrangement 202, 402, 502 in the optical fibre cable (as explained above).

Figure 6:
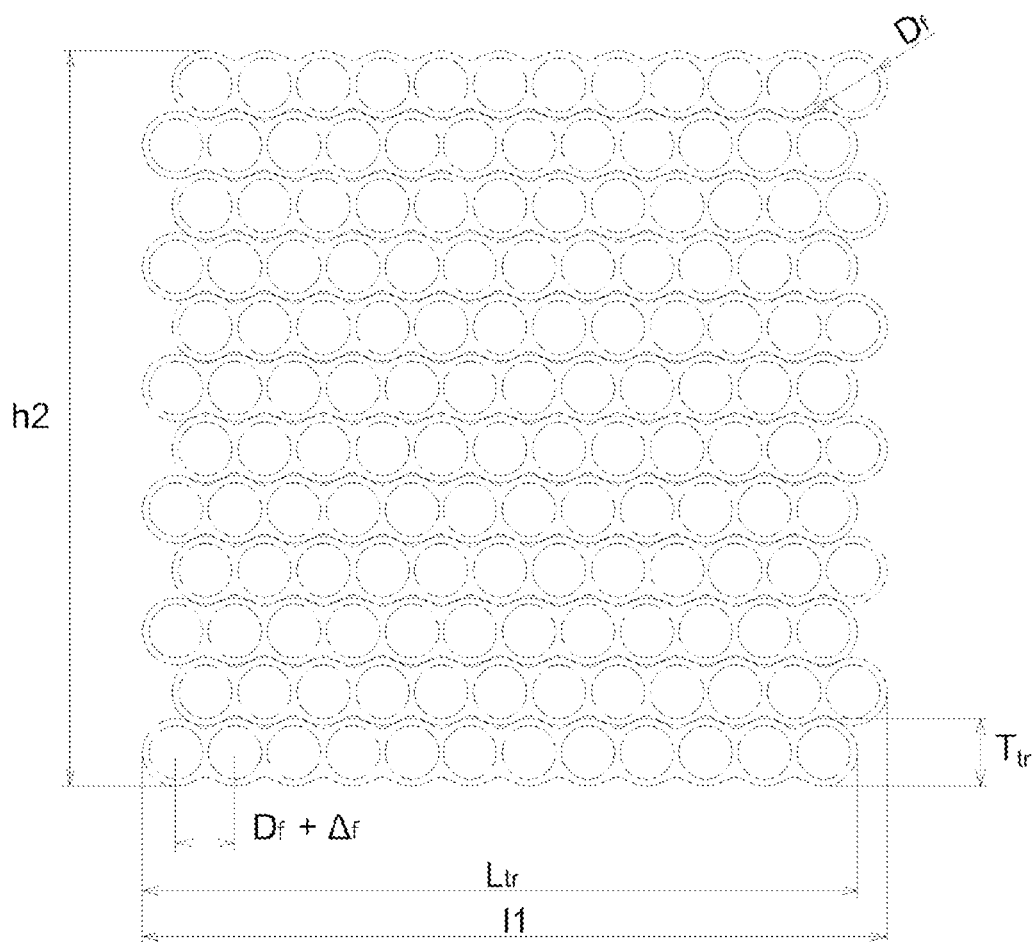
FIG. 6 illustrates a cross sectional view of the optical fibre ribbon stack.

FIG. 6 illustrates a cross sectional view 600 of the optical fibre ribbon stack 102 (as illustrated in FIG. 1). In addition, the optical fibre ribbon stack 102 includes the plurality of optical fibre ribbons. Further, each of the plurality of optical fibre ribbons includes the plurality of optical fibres. Furthermore, each of the plurality of optical fibres is placed adjacent to another optical fibre of the plurality of optical fibres. Moreover, the optical fibre ribbon stack 102 may have a stack height h2. Also, the optical fibre ribbon stack 102 shown in FIG. 6 is not in a parallelogram shape as compared to the optical fibre ribbon stack 102 shown in FIG. 1.

In addition, the plurality of optical fibre ribbons includes the optical fibre ribbon 104. The optical fibre ribbon 104 may have a ribbon height $T_{tr}$ of about 265 microns. The ribbon height $T_{tr}$ of the optical fibre ribbon 104 may vary. The ribbon height $T_{tr}$ corresponds to height of base ribbon layer including matrix of the optical fibre ribbon stack 102. The optical fibre ribbon 104 may have a width $L_{tr}$ of about 3015 microns. The width $L_{tr}$ of the optical fibre ribbon 104 may vary. The width $L_{tr}$ corresponds to total width of the optical fibre ribbon 104. Further, the optical fibre ribbon 104 includes the plurality of optical fibres. Furthermore, each of the plurality of optical fibres may have a fibre diameter $D_f$ of about 200 microns. The fibre diameter $D_f$ of each of the plurality of optical fibres may vary.

In addition, adjacent fibres of the plurality of fibres of the optical fibre ribbon 104 may have a pitch $D_f+\Delta_f$ of about 250 microns. The pitch $D_f+\Delta_f$ of adjacent fibres of the plurality of fibres of the optical fibre ribbon 104 may vary. The pitch $D_f+\Delta_f$ corresponds to centre to centre spacing between adjacent fibres of the plurality of fibres. The $\Delta_f$ corresponds to interstitial fibre spacing. The optical fibre ribbon stack 600 may have an outer length l1 of about 3140 microns. The outer length l1 of the optical fibre ribbon 104 may vary. The optical fibre ribbon stack 102 may have the stack height h2 of about 2835.33 microns. The stack height h2 of the optical fibre ribbon stack 102 may vary.

Figure 7:
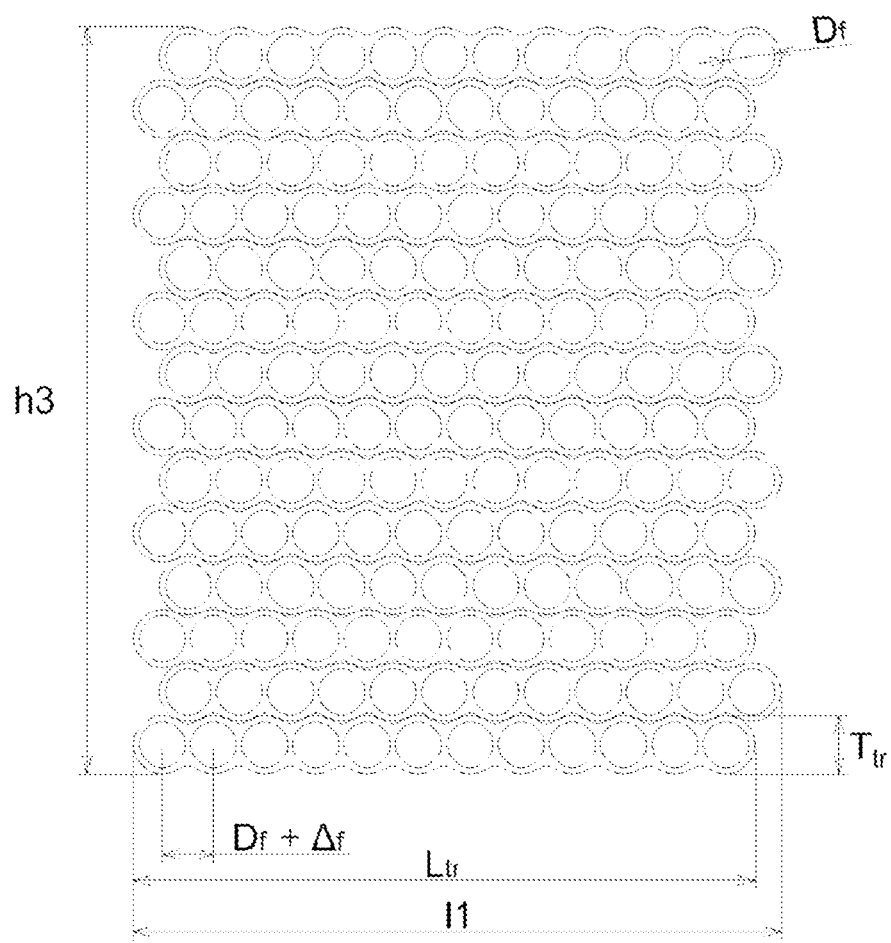
FIG. 7 illustrates a cross sectional view of the optical fibre ribbon stack.

FIG. 7 illustrates a cross sectional view 700 of the optical fibre ribbon stack 102 (as illustrated in FIG. 1). The cross sectional view 700 includes the optical fibre ribbon stack 102. The optical fibre ribbon stack 102 includes a plurality of optical fibre ribbons and a plurality of dummy optical fibre ribbons. In addition, number of the plurality of dummy optical fibre ribbons in the cross sectional view 700 is 2. Further, number of the plurality of dummy optical fibre ribbons in the cross sectional view 700 may vary. Furthermore, total number of the optical fibre ribbon 104 in the cross sectional view 700 is 14. Moreover, number of the optical fibre ribbon 104 in the cross sectional view 700 may vary. In addition, the optical fibre ribbon stack 102 and the plurality of dummy optical fibre ribbons are characterised by a stack height h3. The optical fibre ribbon stack 102 shown in FIG. 7 is not in a parallelogram shape as compared to the optical fibre ribbon stack 102 shown in FIG. 1.

The optical fibre ribbon 104 may have the ribbon height $T_{tr}$ of about 265 microns. The ribbon height $T_{tr}$ of the optical fibre ribbon 104 may vary. The optical fibre ribbon 104 may have the width $L_{tr}$ of about 3015 microns. The width $L_{tr}$ of the optical fibre ribbon 104 may vary. In addition, the optical fibre ribbon 104 includes the plurality of optical fibres. Further, each of the plurality of optical fibres may have the fibre diameter $D_f$ of about 200 microns. The fibre diameter $D_f$ of each of the plurality of optical fibres may vary.

In addition, adjacent fibres of the plurality of fibres of the optical fibre ribbon 104 may have the pitch $D_f+\Delta_f$ of about 250 microns. The pitch $D_f+\Delta_f$ of adjacent fibres of the plurality of fibres of the optical fibre ribbon 104 may vary. The optical fibre ribbon stack 700 may have the outer length l1 of about 3140 microns. The outer length l1 of the optical fibre ribbon 104 may vary. The optical fibre ribbon stack 102 and the plurality of dummy optical fibre ribbons may have the stack height h3 of about 3302.66 microns. The stack height h3 of the optical fibre ribbon stack 102 and the plurality of dummy optical fibre ribbons may vary. The optical fibre ribbon stack 102 and the plurality of dummy optical fibre ribbons may have an improvement in the stack height h3 of about 10.98 percent.

Figure 8A:
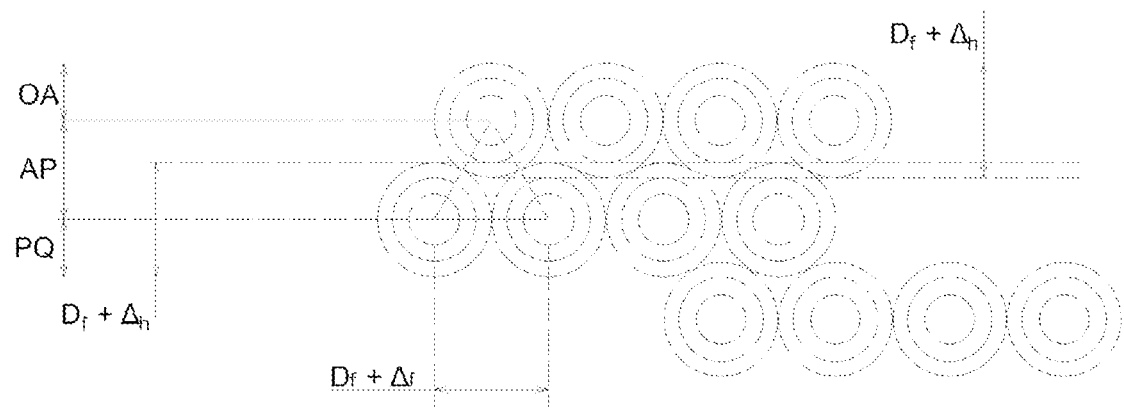
FIG. 8A illustrates an overview of an arbitrary angle stack.
Figure 8B:
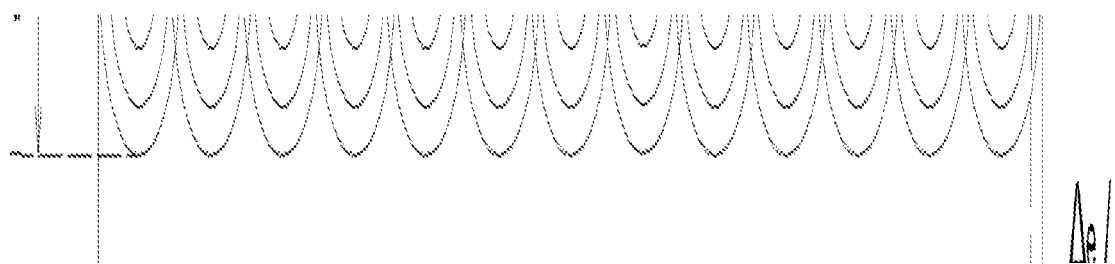
FIG. 8B illustrates another overview of the arbitrary angle stack.

FIG. 8A illustrates an overview of an arbitrary angle stack 800. FIG. 8B illustrates another overview of the arbitrary angle stack 800. The arbitrary angle stack 800 is characterised by a height OA, a height AP, a height PQ, a ribbon height $D_f+\Delta_h$, and the pitch $D_f+\Delta_f$. The $\Delta_f$ corresponds to interstitial fibre spacing. The $\Delta_h$ corresponds to excess height of ribbon matrix on top and bottom. The ribbon height $D_f+\Delta_h$ is equal to the ribbon height $T_{tr}$. In the another overview, the arbitrary angle stack 800 has an excess height of ribbon matrix on top $\Delta_h/2$, an excess width of ribbon matrix along one edge $\Delta_e/2$, and the width $L_{tr}$. The arbitrary angle stack 800 may have an improvement in the stack height in a range of 10 percent to 15 percent. Further, an expression to determine the width $L_{tr}$ of the arbitrary angle stack 800 is given below:

$$L_{tr} = (kD_f + \Delta_e + (k-1)\Delta_f)$$

wherein $$\frac{\Delta_h}{2} = \frac{\Delta_e}{2}$$

In addition, number of the plurality of optical fibre ribbons in a hexagonal ribbon stack is in a range of 12 to 972. Further, number of the plurality of optical fibre ribbons may vary. Furthermore, number of the plurality of optical fibres in a ribbon is in the range of 4 to 36. Moreover, number of the plurality of optical fibres in a ribbon may vary.

The arbitrary angle stack 800 may have the fibre diameter $D_f$ in a range of 200 microns to 250 microns. The fibre diameter $D_f$ of the arbitrary angle stack 800 may vary. The arbitrary angle stack 800 may have the excess height of ribbon matrix on top and bottom $\Delta_h$ in a range of 55 microns to 65 microns. The excess height of ribbon matrix on top and bottom $\Delta_h$ of the arbitrary angle stack 800 may vary. The arbitrary angle stack 800 may have the interstitial fibre spacing $\Delta_f$ in a range of 0 microns to 50 microns. The interstitial fibre spacing $\Delta_f$ of the arbitrary angle stack 800 may vary.

The arbitrary angle stack 800 is characterised by the height OA, the height AP, and the height PQ. In addition, the height AP is contribution to any layer that is not base layer of the arbitrary angle stack 800. Further, an expression to determine the height AP of the arbitrary angle stack 800 is given below:

$$AP^2 = (D_f + \Delta_h)^2 \left(1 - \frac{(1+p)^2}{4}\right)$$

wherein $$OA = PQ = \frac{D_f + \Delta_h}{2} \frac{D_f + \Delta_h}{2}; \text{ and}$$

$$p = \frac{\Delta_f - \Delta_h \Delta_f - \Delta_h}{D_f + \Delta_h D_f \Delta_h}$$

$$p = \frac{\Delta_f - \Delta_h \Delta_f - \Delta_h}{D_f + \Delta_h D_f + \Delta_h}$$

Furthermore, the ribbon height $T_{tr}$ of the optical fibre ribbon stack 102 is a summation of the base layer height. Moreover, an expression to determine the ribbon height $T_{tr}$ of the arbitrary angle stack 800 is given below:

$$T_{tr} = (D_f + \Delta_h)\left(1 + (N_r - 1)\left(1 - \frac{(1+p)^2}{4}\right)^{\frac{1}{2}}\right)$$

wherein $p \in [-3, 1]$ and
$N_r$ is number of the plurality of the optical fibre ribbons
Also, an expression to determine a width $W_{tr}$ of the arbitrary angle stack 800 is given below:

$$W_{tr} = (D_f + \Delta_h) + ((N_f - 1)(D_f + \Delta_f))$$

wherein $N_f$ is number of the plurality of optical fibres
for $N_r = 1$ or $p = -1$ $$W_{tr} = (D_f + \Delta_h) + \left(\left(N_f - \frac{1}{2}\right)(D_f + \Delta_f)\right)$$

for $N_r > 1$

For a hexagonal stack, the inter-fiber spacing along the width of the ribbon must be equal to the interstitial distance along the height of the stack. So, we run into a constraint:

$$\Delta_f = \Delta_h$$

hence, $$p = 0$$

The basic ribbon stack shown here in FIG. 1 is a normal 12×12 ribbon stack evolved at a 60° angle to the base layer. Three such ribbon stacks rotated by 120° with reference to each other form a hexagon (as illustrated in FIG. 2). A hexagonal stack can become an evolved sub-unit or simply cascaded to agglomerate even larger stacks to form even larger hexagons, to fill the circle.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

Although the present disclosure has been explained in relation to its preferred embodiment(s) as mentioned above, it is to be understood that many other possible modifications and variations can be made without departing from the spirit and scope of the inventive aspects of the present invention. It is, therefore, contemplated that the appended claim or claims will cover such modifications and variations that fall within the true scope of the invention.

What is claimed is:

1. A method for stacking a plurality of optical fibre ribbons for use in an optical fibre cable, the method comprising:
   arranging a plurality of optical fibre ribbon stacks in a hexagonal arrangement for use in the optical fibre cable, wherein the plurality of optical fibre ribbon stacks arranged in the hexagonal arrangement is in contact with each other.

2. The method as claimed in claim 1 further comprising stacking the plurality of optical fibre ribbons to form an optical fibre ribbon stack of the plurality of optical fiber ribbon stacks such that the optical fibre ribbon stack has a parallelogram shape.

3. The method as claimed in claim 1 further comprising stacking the plurality of optical fibre ribbons to form an optical fibre ribbon stack of the plurality of optical fiber ribbon stacks such that the optical fibre ribbon stack has a parallelogram shape, wherein each optical fibre ribbon is placed at an offset from an adjacent optical fibre ribbon, wherein the offset is between 25% to 75% of a pitch of an optical fibre ribbon.

4. The method as claimed in claim 1 further comprising stacking the plurality of optical fibre ribbons to form an optical fibre ribbon stack of the plurality of optical fiber ribbon stacks such that the optical fibre ribbon stack has a parallelogram shape, wherein the parallelogram shape is at a 60 degree angle to a base layer.

5. The method as claimed in claim 1, wherein the hexagonal arrangement has a packaging density greater than 80%.

6. The method as claimed in claim 1, wherein an optical fibre ribbon stack of the plurality of optical fibre ribbon stacks has a stack height, wherein each optical fibre ribbon of the plurality of optical fibre ribbons has a ribbon height, wherein the stack height is less than a summation of the ribbon height of each optical fibre ribbon of the plurality of optical fibre ribbons.

7. An optical fibre cable comprising:
   a plurality of optical fibre ribbon stacks in a hexagonal arrangement in the optical fibre cable wherein the plurality of optical fibre ribbon stacks arranged in the hexagonal arrangement is in contact with each other.

8. The optical fibre cable as claimed in claim 7 further comprising a plurality of optical fibre ribbons, wherein the plurality of optical fibre ribbons are stacked to form the optical fibre ribbon stack of the plurality of optical fibre ribbon stacks such that the optical fibre ribbon stack has a parallelogram shape.

9. The optical fibre cable as claimed in claim 7 further comprising a plurality of optical fibre ribbons, wherein the plurality of optical fibre ribbons are stacked to form the optical fibre ribbon stack of the plurality of optical fibre ribbon stacks such that the optical fibre ribbon stack has a parallelogram shape, wherein each optical fibre ribbon is placed at an offset from an adjacent optical fibre ribbon, wherein the offset is between 25% to 75% of a pitch of an optical fibre ribbon.

10. The optical fibre cable as claimed in claim 7, wherein the hexagonal arrangement has a packaging density greater than 80%.

11. The optical fibre cable as claimed in claim 7, wherein an optical fibre ribbon stack of the plurality of optical fibre ribbon stacks has a stack height, wherein each optical fibre ribbon of the plurality of optical fibre ribbons has a ribbon height, wherein the stack height is less than a summation of the ribbon height of each optical fibre ribbon of the plurality of optical fibre ribbons.

12. A method for stacking a plurality of optical fibre ribbons for use in an optical fibre cable, the method comprising:
   stacking the plurality of optical fibre ribbons to form an optical fibre ribbon stack such that the optical fibre ribbon stack has a parallelogram shape; and
   arranging a plurality of three optical fibre ribbon stacks in a hexagonal arrangement for use in the optical fibre cable, wherein the plurality of optical fibre ribbon stacks arranged in the hexagonal arrangement is in contact with each other.

13. The method as claimed in claim 12, wherein each optical fibre ribbon of the plurality of optical fibre ribbons is placed at an offset from an adjacent optical fibre ribbon, wherein the offset is between 25% to 75% of a pitch of an optical fibre ribbon.

14. The method as claimed in claim 12, wherein the parallelogram shape is at a 60 degree angle to the base layer.

15. The method as claimed in claim 12, wherein the hexagonal arrangement has a packaging density greater than 80%.

16. The method as claimed in claim 12, wherein the optical fibre ribbon stack has a stack height, wherein each optical fibre ribbon of the plurality of optical fibre ribbons has a ribbon height, wherein the stack height is less than a summation of the ribbon height of each optical fibre ribbon of the plurality of optical fibre ribbons.

* * * * *